US007602135B2

(12) United States Patent
Huber et al.

(10) Patent No.: US 7,602,135 B2
(45) Date of Patent: Oct. 13, 2009

(54) ARRANGEMENT HAVING AT LEAST ONE MOVABLE FURNITURE PART

(75) Inventors: Edgar Huber, Hard (AT); Uwe Scheffknecht, Höchst (AT)

(73) Assignee: Julius Blum Gesellschaft m.b.H., Hochst (AT)

( * ) Notice: Subject to any disclaimer, the term of this patent is extended or adjusted under 35 U.S.C. 154(b) by 1067 days.

(21) Appl. No.: 10/447,142

(22) Filed: May 29, 2003

(65) Prior Publication Data

US 2004/0100169 A1 May 27, 2004

(30) Foreign Application Priority Data

Jun. 27, 2002 (AT) ............................... A 962/2002

(51) Int. Cl.
*G05D 13/00* (2006.01)

(52) U.S. Cl. ....................... 318/651; 318/560; 318/638; 318/646; 318/652

(58) Field of Classification Search ................. 318/138, 318/254, 439, 560–700
See application file for complete search history.

(56) References Cited

U.S. PATENT DOCUMENTS

| | | | | |
|---|---|---|---|---|
| 3,794,401 | A * | 2/1974 | Dean et al. | 312/323 |
| 4,159,658 | A * | 7/1979 | Parkinson | 74/813 L |
| 4,731,733 | A * | 3/1988 | Knoll | 700/56 |
| 5,030,901 | A * | 7/1991 | Futami | 318/610 |
| 5,059,881 | A * | 10/1991 | Fujita et al. | 318/630 |
| 5,064,044 | A * | 11/1991 | Oketani et al. | 192/141 |
| 5,087,107 | A * | 2/1992 | Fumanelli | 312/333 |
| 5,158,347 | A * | 10/1992 | Warren et al. | 312/319.8 |
| 5,635,808 | A * | 6/1997 | Roseliep | 318/638 |
| 5,757,156 | A * | 5/1998 | Sasajima | 318/456 |
| 5,804,937 | A * | 9/1998 | Sasajima et al. | 318/259 |
| 5,940,306 | A * | 8/1999 | Gardner et al. | 700/244 |
| 6,137,255 | A * | 10/2000 | Skalski | 318/687 |

FOREIGN PATENT DOCUMENTS

| | | |
|---|---|---|
| DE | 4402899 | 8/1995 |
| DE | 19639974 | 6/1997 |
| DE | 10105756 A1 | 8/2001 |
| EP | 0 994 560 A1 | 4/2000 |
| EP | 1323363 A1 | 7/2003 |
| EP | 1323364 A1 | 7/2003 |
| JP | 55166763 * | 12/1980 |
| JP | 02-265506 | 10/1990 |
| JP | 11-089642 | 4/1999 |
| WO | 97/46779 | 11/1997 |

* cited by examiner

*Primary Examiner*—Bentsu Ro
*Assistant Examiner*—Thai Dinh
(74) *Attorney, Agent, or Firm*—Wenderoth, Lind & Ponack, L.L.P.

(57) ABSTRACT

An arrangement having at least one movable furniture part, in particular having a drawer or the like, having at least one drive unit and at least one regulating device for regulating the at least one drive unit, wherein the arrangement (7) has at least one, preferably analog, acceleration measuring device (2), with the at least one acceleration measuring device (2) generating an acceleration signal that is characteristic of accelerations caused by forces applied to the at least one movable furniture part (3) from the outside and that may be supplied to the at least one regulating device (1).

53 Claims, 16 Drawing Sheets

3
7
12
17
18
22
28
29
5
10
11

15
18
19
17

15
19
5
29
14

10
29
5
19
14
15

22
19

ARRANGEMENT HAVING AT LEAST ONE MOVABLE FURNITURE PART

FIELD OF INVENTION

The present invention relates to an arrangement having at least one movable furniture part, in particular having a drawer or the like, having at least one drive unit and at least one regulating device for regulating the at least one drive unit.

DESCRIPTION OF RELATED ART

Arrangements of this kind are in principle already known. For example, U.S. Pat. No. 5,158,347 describes an item of office furniture in which the drawers are moved by a motor over a first region of the entire opening distance once an identification code has been input. EP 0 957 225 describes an opening means for a closure element, for example a drawer, that is triggered by way of a capacitor that discharges electrically when touched by the user. Here too, the drawer is only moved partly out of the furniture carcass. German patent specification DE 10 17 351 describes a device for pulling drawers out of or pushing them into items of furniture, which may be triggered by push buttons arranged on the carcass. In this case, by using the push buttons, any possible position for the drawer along the entire opening distance is possible. In this case, it is problematic that such opening aids always have to be triggered by way of actuating elements provided specifically therefor, which many users find awkward. Particularly for those people who are skeptical about technology in general, it would be advantageous if it were possible to operate driven movable furniture parts in the good old-fashioned way, by pushing or pulling on the drawer.

SUMMARY OF THE INVENTION

The object of the present invention is to provide a generic arrangement that makes it possible to operate intuitively a movable furniture part that is driven by a drive unit.

This object is achieved in accordance with the invention in that the arrangement has at least one, preferably analog, acceleration measuring device, with the at least one acceleration measuring device generating an acceleration signal that is characteristic of accelerations caused by forces applied to the at least one movable furniture part from the outside and that may be supplied to the at least one regulating device.

It is technically advantageous herein that in the arrangement according to the invention there are no longer any actuating elements of any kind provided to trigger the drive unit for the movable furniture parts. It is economically advantageous herein that a greater level of acceptance on the market is to be expected for the arrangement according to the invention.

It is not significant whether the acceleration is measured directly or calculated from other measured variables. In this sense, a device for determining the position of the movable furniture part combined with a clock also forms an acceleration measuring device. In this case, the speed can be determined from the distance covered in a given time span, and the acceleration can be determined from the change in speed.

According to the invention, however, recognition of the fact that an acceleration of the movable furniture part has taken place is already sufficient, regardless of the magnitude or direction of the acceleration.

Advantageously, in one embodiment of the invention it is provided for the at least one drive unit to include an electric motor. Extremely small electric motors of this kind are commercially available and guarantee problem-free operation with a low current consumption.

A particularly advantageous embodiment of the invention results when the acceleration signal contains information on the magnitude and/or direction, preferably the directional component parallel to the direction of pulling out the movable furniture part, of the acceleration caused by forces applied to the movable furniture part from the outside. This allows the acceleration measuring device to make information available to the regulating device about the direction in which actuation of the draw should be performed. If the regulating device receives, for example, from the acceleration measuring device the signal of a pulling acceleration being present, it can immediately send the drive unit a control command to move the movable furniture part in the direction of the measured pulling acceleration. In this case, which opening condition the draw is in at the time of external actuation has no significance per se. Advantageously, however, it is provided that, in a certain region before the opened and closed end positions of the movable furniture part, there is no longer a driven movement of the furniture part, in order to prevent damage to the furniture part or the arrangement according to the invention. For this purpose, it is advantageous for the arrangement to have at least one position measuring device that generates a position signal that is characteristic of the opening condition of the movable furniture part and may be supplied to the regulating device. In this way, the regulating device can recognize at any time whether the movable furniture part is in the vicinity of one of the end positions.

Advantageously, the acceleration signal emitted by the acceleration measuring device to the regulating device also contains information on the magnitude of the acceleration of the movable furniture part that the user exerts on it. It is possible for example to conclude from an acceleration of large magnitude that rapid opening or closing is desired, as a result of which the regulating device can actuate the drive unit in a manner corresponding to the situation.

An advantageous embodiment of the invention results when the drive unit accelerates the movable furniture part approximately evenly over a predetermined time span. Because the acceleration of the movable furniture part is performed only over a predetermined time span, the illusion for the user that the furniture part is not driven is maintained. Once the time span has expired, the movable furniture part is braked by the friction inherent in the system just as though no drive unit were present. However, it would also be possible to provide for a lower acceleration to be maintained after the time span of acceleration, in order to compensate the braking caused by the friction. This maintains the impression of a non-driven furniture part that is, for example, mounted in a manner with particularly low friction. Alternatively, or in addition, it may also be provided for the drive unit to accelerate the movable furniture part only over a predeterminable or predetermined partial distance whereof the length is shorter than the length of the total distance between the closed end position and the opened end position of the movable furniture part. Because the drive unit is not active over the entire opening distance, the sought invisibility of the technology is maintained.

It may also be provided for the movement of the movable furniture part by the drive unit to be independent of the magnitude of the pulling or pushing acceleration. As a result of this, the user is the only one to decide, through the magnitude of force he or she applies, how fast the movement of the movable furniture part is to be, with the drive unit always providing the same supporting acceleration.

A particularly advantageous embodiment of the invention results when the regulating device has an actual-value calculating device that calculates, from the position signal generated by the position measuring device, the current actual position and/or the current actual speed of the movable furniture part. As a result of knowing the current position and speed of the movable furniture part, it is possible for the drive unit to perform an acceleration over defined partial distances, for example in the vicinity of the end positions of the movable furniture part, in such a way that the movable furniture part comes to a standstill in the respective end position.

In a further advantageous embodiment of the invention, it is provided for the arrangement to include at least one initialization device that generates a signal that is characteristic of certain predetermined positions of the movable furniture part in each case and may be supplied at least to the position measuring device. If the arrangement according to the invention is not equipped with expensive non-erasable electronic memory elements, then once the arrangement according to the invention has been disconnected from the voltage source, for example, the position of the movable furniture part in relation to the arrangement according to the invention must be established. Because the arrangement according to the invention is moreover commercially available in variously sized formats, the length of the total distance between the closed and the opened end positions of the movable furniture part and the positions of the movable furniture part in the closed and opened end positions must be established, at least on first start-up. This can be done for example by the user triggering the initialization device by way of an actuating element that is readily accessible from outside the arrangement, for example a button. With an initialization procedure of this kind, it may for example be provided for the user to move the movable furniture part into the closed end position, to actuate the actuating element there and then to move the movable furniture part into the opened end position and to actuate the actuating element again. The result of this is that the information required about the total length of the movement of the movable furniture part and about the position of the movable furniture part in the particular positions is available to the regulating device.

Alternatively, or in addition, initialization by a collision recognition would also be possible. In this case, the movable furniture part would travel slowly in the direction of one of the two end positions and, on reaching this, automatically trigger the initialization device as a result of the detected collision. For example, the drive unit could first move the movable furniture part in the direction of the closed end position and, when the front panel collided with the front side of the arrangement, the zero position could be automatically established by the initialization device. After that the drive unit could move the movable furniture part in the direction of the opened end position and, on collision, this position could be automatically established by the initialization device. The collision itself could for example be detected by a sudden rise in the current supplied to the drive unit, with the rise being attributable to those forces occurring between the movable furniture part and the arrangement that the drive unit attempts to overcome. It goes without saying that if a certain level of current were exceeded, it would cause the drive unit to be switched off in order to prevent damage. It would also be possible to trigger the initialization device if the magnitude of the speed of the movable furniture part over a predetermined time span were less than or equal to a predetermined limit value, for example zero.

With a touch-latch construction, the closed end position established by the initialization device would of course not be the position of the movable furniture part on collision, but a position lying further out by a predetermined distance. This would ensure the gap required for the touch-latch triggering between the front side of the arrangement and the front panel of the movable furniture part in the closed end position.

In a further advantageous embodiment of the invention, it is provided for the initialization device to be capable of being triggered by way of an actuating element that is arranged within the arrangement and is actuable by the movable furniture part. This removes the need for the user to actuate a special actuating element. An actuating element of this kind, arranged within the arrangement, may for example be constructed as a limit switch for determining the closed end position of the movable furniture part. For example, it may be provided for this limit switch to be constructed as a pressure switch. When the movable furniture part is pushed in, either by way of the drive unit or by the user, the limit switch is actuated by the movable furniture part over the last few millimeters of the distance of pushing in. As a result, the closed end position of the movable furniture part in the arrangement according to the invention is established. It may also be provided for the limit switch or the actuating element to be constructed in general as an inductive or capacitive sensor, with the result that the respective end positions of the movable furniture part may be detected without making contact. Other types of sensor known to those skilled in the art may also be provided.

It is also conceivable for the initialization device to be capable of being triggered by making a conductive connection between the arrangement and a voltage source by way of a triggering element. As a result, initialization takes place automatically on first start-up or when the voltage supply is re-established after a power failure.

It goes without saying that it is also possible to provide for two more constructions of the above-mentioned types of actuation of the initialization device to be combined in an arrangement according to the invention. It goes without saying that triggering of the initialization device may also be performed by its being manually pulled out. In this case, the movable furniture part is moved manually by a user, for example out of the closed end position into the fully opened end position.

In a further advantageous embodiment of the invention, it is provided for the movable furniture part to be mounted movably on frames arranged laterally within the arrangement. Frames of this kind, which are per se part of the prior art, allow a low-friction and secure mounting of the movable furniture part in the arrangement according to the invention.

In a further advantageous embodiment of the invention, it is provided for the drive unit to be attached to a frame. This may for example make a separate drive unit available for each movable furniture part. It may also be possible to attach frames to which drive units are secured in an arrangement according to the invention from the outset.

In a further advantageous embodiment of the invention, it is provided for the drive unit to be attached to the inner face of the arrangement opposite the rear wall of the movable furniture part, preferably at approximately the same spacing from the two side walls of the arrangement. This allows the movable furniture part to be accelerated largely without tilting when the drive unit is arranged centrally.

In a further advantageous embodiment of the invention, it is provided for the drive unit to be in constant connection with the movable furniture part. This makes it possible for the movable furniture part to be accelerated by the drive unit, regardless of the current position of the movable furniture part in relation to the arrangement according to the invention. For this, it is useful if for example the drive unit is in constant connection with the movable furniture part by way of at least one cable or a belt, preferably a toothed belt, or by way of a toothed wheel engaging in a toothed rack. The use of a toothed belt in this case guarantees a slip-free connection between the movable furniture part and the drive unit. Force may be exerted for example by the belt running over at least two rollers that are arranged on a lateral frame. It goes without saying that it is also possible for both lateral frames to be constructed to have at least two rollers, over which a respective belt is guided for the transmission of forces. It also goes without saying that the use of a cable without slip would be possible if both cable ends were fixed to the driven roller and so the one cable end were unwound and the other cable end wound up at the same time.

Above a certain width of the movable furniture part, it is advantageous if at least two rollers arranged on different frames are in a—preferably rigid—connection with one another by way of a connection shaft, and so may be moved by the drive unit.

A further advantageous embodiment of the invention results from at least one roller on at least one frame being drivable by the drive unit. This enables forces to be transmitted with lower losses than would be achievable if transmission devices were interposed between the drive unit and the movable furniture part.

In order to achieve more advantageous transmission of the movement of the drive unit to the movable furniture part, it may be provided for the at least one roller on at least one frame to be drivable by the drive unit by way of a gear. With a wide movable furniture part, it is again useful if gears are provided at both ends of the connection shaft. With very wide movable furniture parts, it may also be provided for drive units to be arranged on both sides of the movable furniture part, these drive units either having their own regulating devices and a synchronization means, or being capable of being controlled by a common regulating device.

In a further advantageous embodiment of the invention, it may be provided for the arrangement to include a resolver for measuring the position and/or speed and/or acceleration of the movable furniture part, whereof the signals may be supplied to the regulating device. Resolvers of this kind are commercially available and are extremely robust both mechanically and thermally. A resolver of this kind is constructed in accordance with the principle of a rotary transformer. Commercially available resolvers are frequently available with an integrated evaluation circuit, with the result that the signal thereof can be supplied directly to the regulating device.

In a further advantageous embodiment of the invention, it may be provided for the arrangement to include an optical encoder for measuring the position and/or speed and/or acceleration of the movable furniture part, whereof the signals may be supplied to the regulating device. Optical or indeed magnetic encoders of this kind represent a low-cost and frequently also space-saving alternative to resolvers. At the same time, they still guarantee a satisfactory angular range of triggering for an arrangement according to the invention, for example from 64 to 1024 pulses/revolution. Certain disadvantages with optical and magnetic encoders are produced from their sensitivity to mechanical vibration, soiling and the lack of absolute angle information at the time of switching on, with the result that encoders of this kind can only determine positions incrementally.

In a further advantageous embodiment of the invention, it is provided for the drive unit to include a brushless d.c. motor and for measurement of the position and/or speed and/or acceleration of the movable furniture part to be made directly by way of the commutator signal, with it being possible to supply the signals obtained in this way to the regulating device. Frequently, brushless motors of this kind are commercially available with a Hall-effect sensor construction.

Nowadays, extremely small electric motors are already available in which an electronic, optical or magnetic position measuring device is already integrated in the electric motor, which saves both space and time on installation.

The present invention furthermore relates to a process for moving a movable furniture part, in particular a draw, that is mounted in or on an arrangement, by a drive unit, in particular an electric motor, with the arrangement having a drive unit regulator and a position measuring device, wherein the position measuring device sends the drive unit regulator signals and the drive unit regulator gives the drive unit the command for accelerating the movable furniture part in dependence on these signals.

The position measuring device in this case represents a particularly simple way of realizing the acceleration measuring device, as already mentioned.

For example, it may be provided, in the event of a change in the movement condition of the movable furniture part that is caused from the outside, for the position measuring device to send a signal to the drive unit regulator and for the latter to give the drive unit the command for accelerating the movable furniture part. It goes without saying that a change in the movement condition should be understood—as is customary in physics—to include both starting up of the movable furniture part and a change in the speed of a movable furniture part performing an even movement.

However, it may also be provided, once the movable furniture part has moved over a predeterminable or predetermined distance, for the position measuring device to send a signal to the drive unit regulator and for the latter to give the drive unit the command for accelerating the movable furniture part. This case is thus purely a matter of distance measurement. The drive unit is activated as soon as the movable furniture part has covered the predetermined distance. The time required therefor has no effect.

With this triggering process, advantageously it may furthermore advantageously be provided for the distance to be covered by the movable furniture part, in accordance with which the position measuring device emits a signal to the drive unit regulator, to be adjustable or adjusted differently depending on the direction of movement of the movable furniture part. For example, a distance of 1 millimeter could be selected as the activation distance for triggering a movement directed away from the furniture carcass, whereas triggering of a movement directed toward the furniture carcass takes place after a distance of 10 millimeters.

BRIEF DESCRIPTION OF THE DRAWINGS

Further advantages and details of the arrangement according to the invention will become apparent from the figures below and from the associated description of the figures, in which.

DETAILED DESCRIPTION OF PREFERRED EMBODIMENTS

Figure 1A:
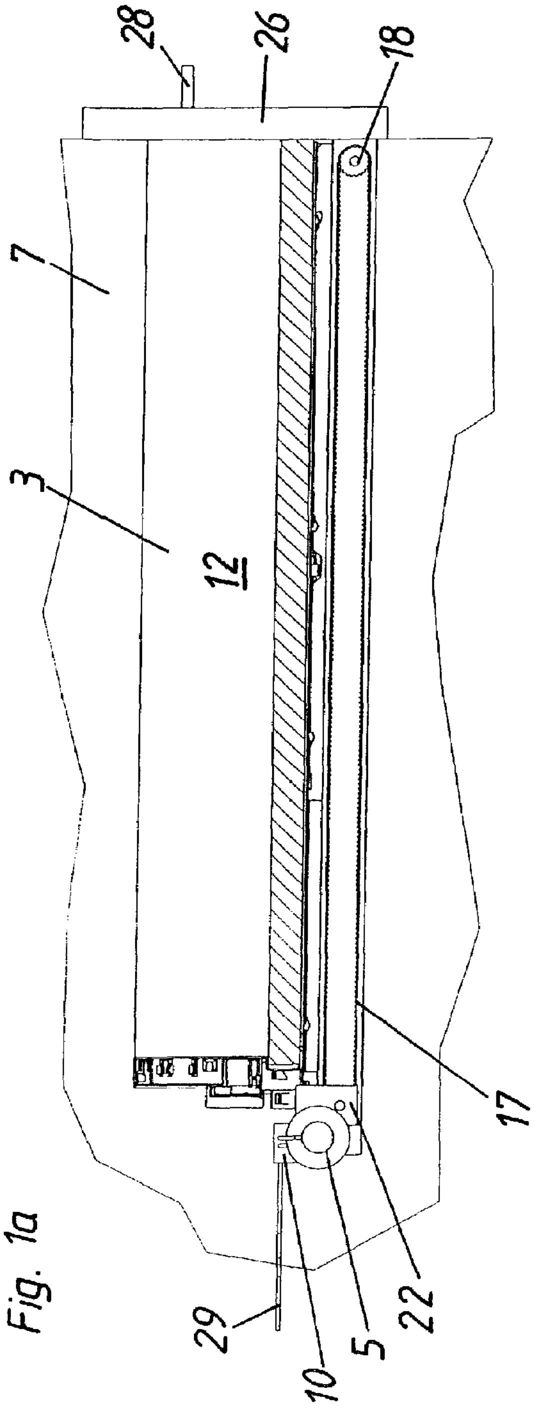
FIGS. 1a and 1b show an arrangement according to the invention, partly in cross-section, with the movable furniture part in the closed end position and in the triggered condition.

Visible in FIG. 1a is a movable furniture part 3, constructed as a drawer, in a view toward one of its side faces 12. It can be seen that the drawer is constructed with a handle 28. The movable furniture part 3 is mounted such that it is linearly movable in an arrangement 7 according to the invention, with forces transmitted from the drive unit 5 by way of a gear 22 to a toothed belt 17 that runs on rollers 18. Also visible is the drive unit regulator 10. The supply of power to the electrical components is by way of a conductive connection 29. Visible in FIG. 1a is the movable furniture part 3 in the closed end position, in which the front panel 26 of the movable furniture part 3 lies directly against the front side of the arrangement 7 according to the invention. Not shown is the fact that a user (not illustrated) is exerting a pull on the handle element 28, as a result of which the movable furniture part 3 moves into the triggered condition, illustrated in FIG. 1b.

Figure 1B:
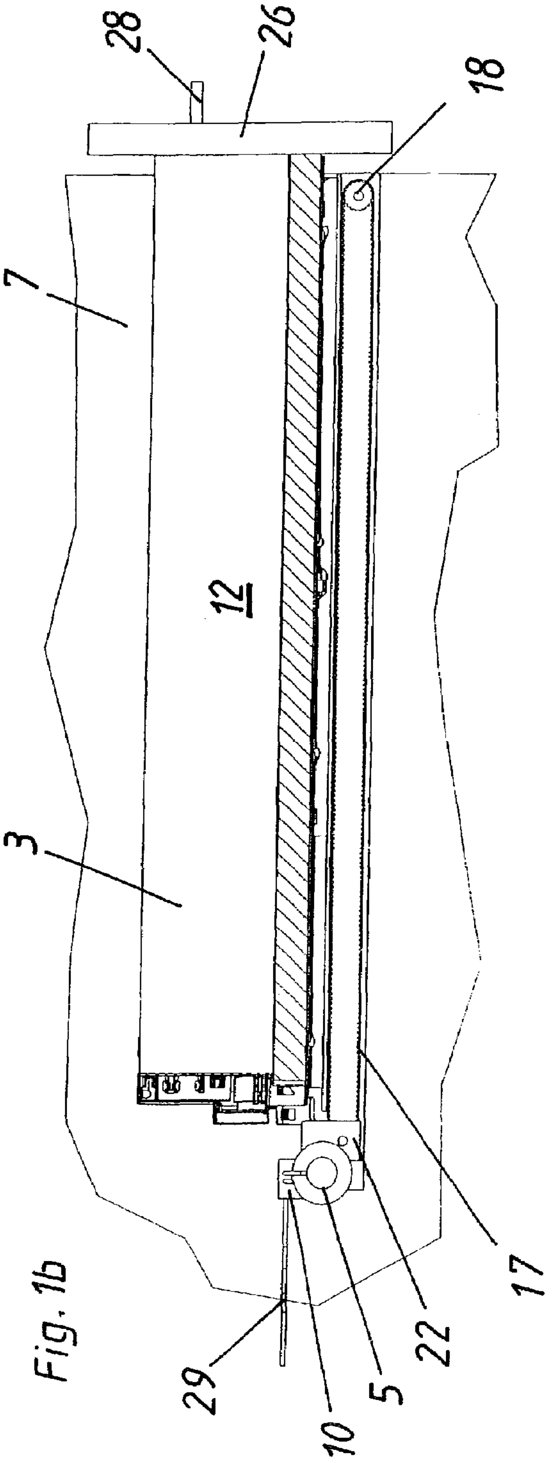
Figures 2A, 2B:
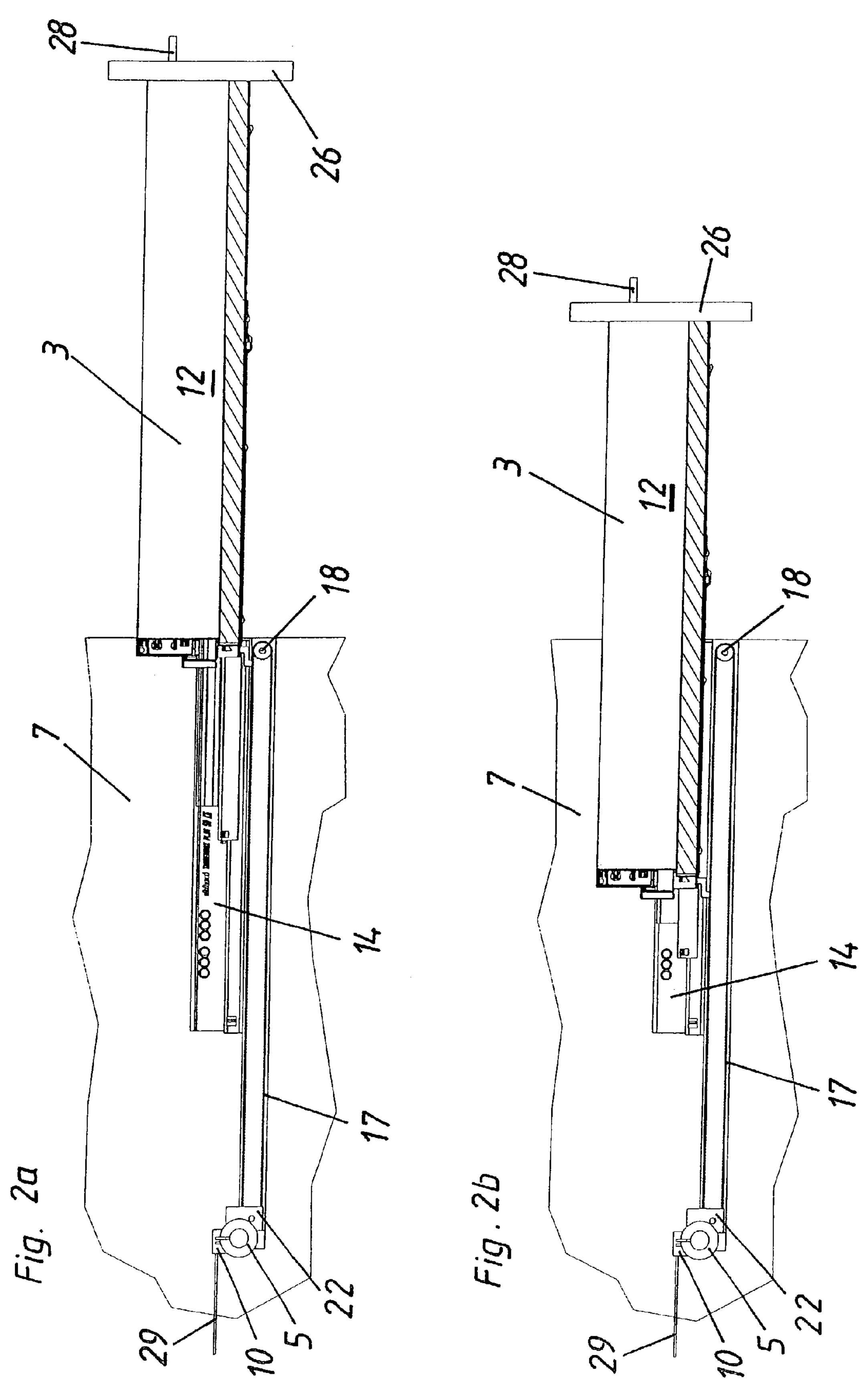
FIGS. 2a and 2b show an arrangement according to the invention, partly in cross-section, with the movable furniture part in the opened end position and in an intermediate position.

FIG. 2a once again shows the arrangement illustrated in FIGS. 1a and 1b, with the movable furniture part 3 in the meantime moved into the opened end position. Visible is one of the two lateral frames 14 on which the movable furniture part 3 is mounted. After another actuation (not illustrated) by a user (not illustrated), the movable furniture part 3 in FIG. 2b is in a location between the opened end position and the closed end position.

Figures 3A, 3B, 3C:
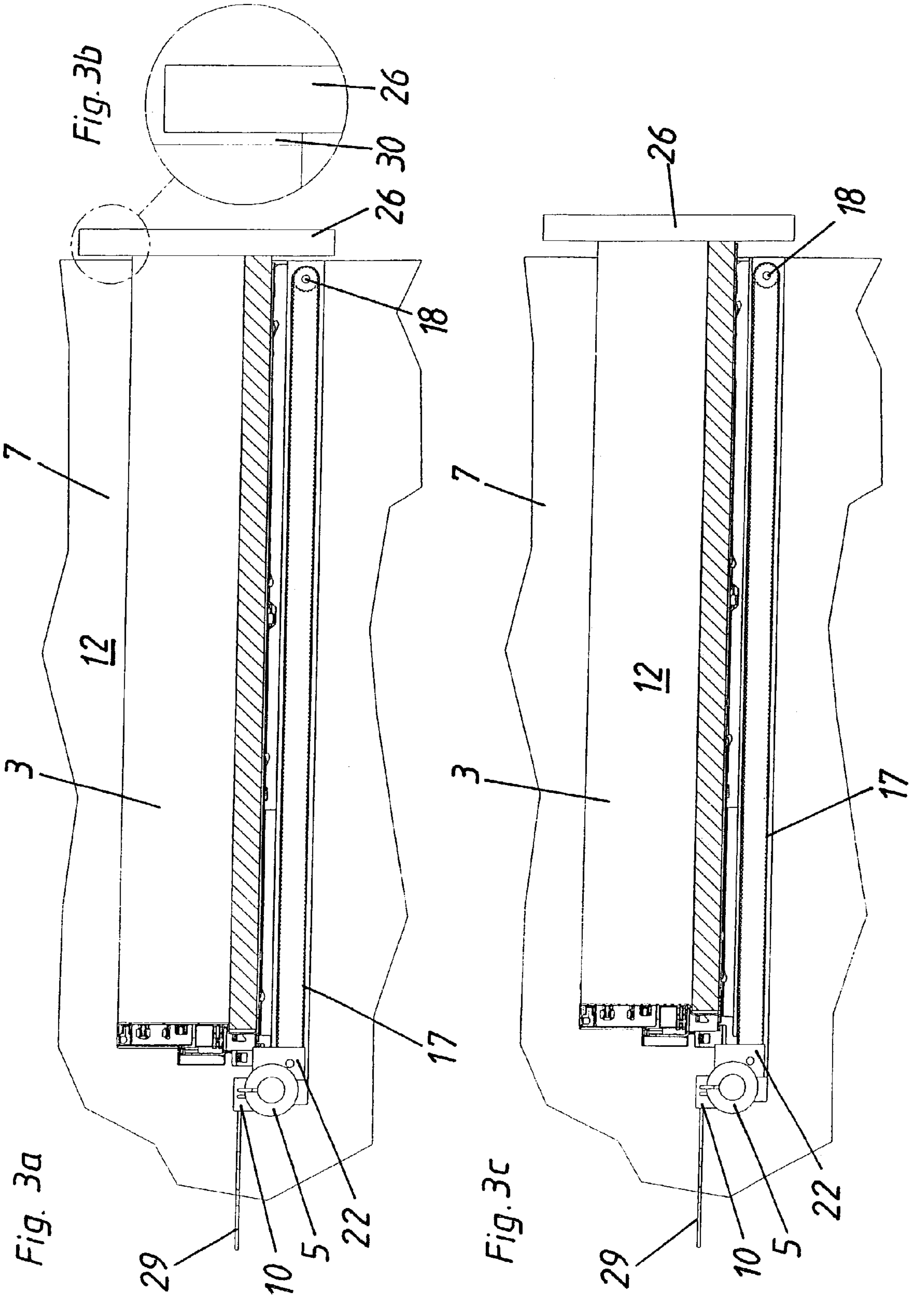
FIGS. 3a, 3b and 3c show a variant on an arrangement according to the invention, partly in cross-section, with the movable furniture part in the closed end position, an associated detail view, and with the movable furniture part in the triggered condition.

Illustrated in FIGS. 3a, 3b and 3c is an arrangement according to the invention in a touch-latch construction. It is clear from FIG. 3a and from the detail in FIG. 3b that with a variant of this kind there is a gap 30 between the front side of the arrangement according to the invention and the front panel 26 of the movable furniture part 3, even in the closed end position of the movable furniture part 3. This allows the movable furniture part 3 to be opened in a manner similar to the prior art known with such constructions, with the result that it will not be explained in more detail here. It goes without saying that it would be possible with a construction of this kind for support by the drive unit 5 to take place only once the movable furniture part 3 has been triggered, that is to say for example in the condition illustrated in FIG. 3c. This accords with the basic idea that the user should notice the support given by the drive unit as little as possible. However, it is also possible to provide immediate support, at least on the pull-out movement following pressure against the front panel.

Figures 4A, 4B, 4C:
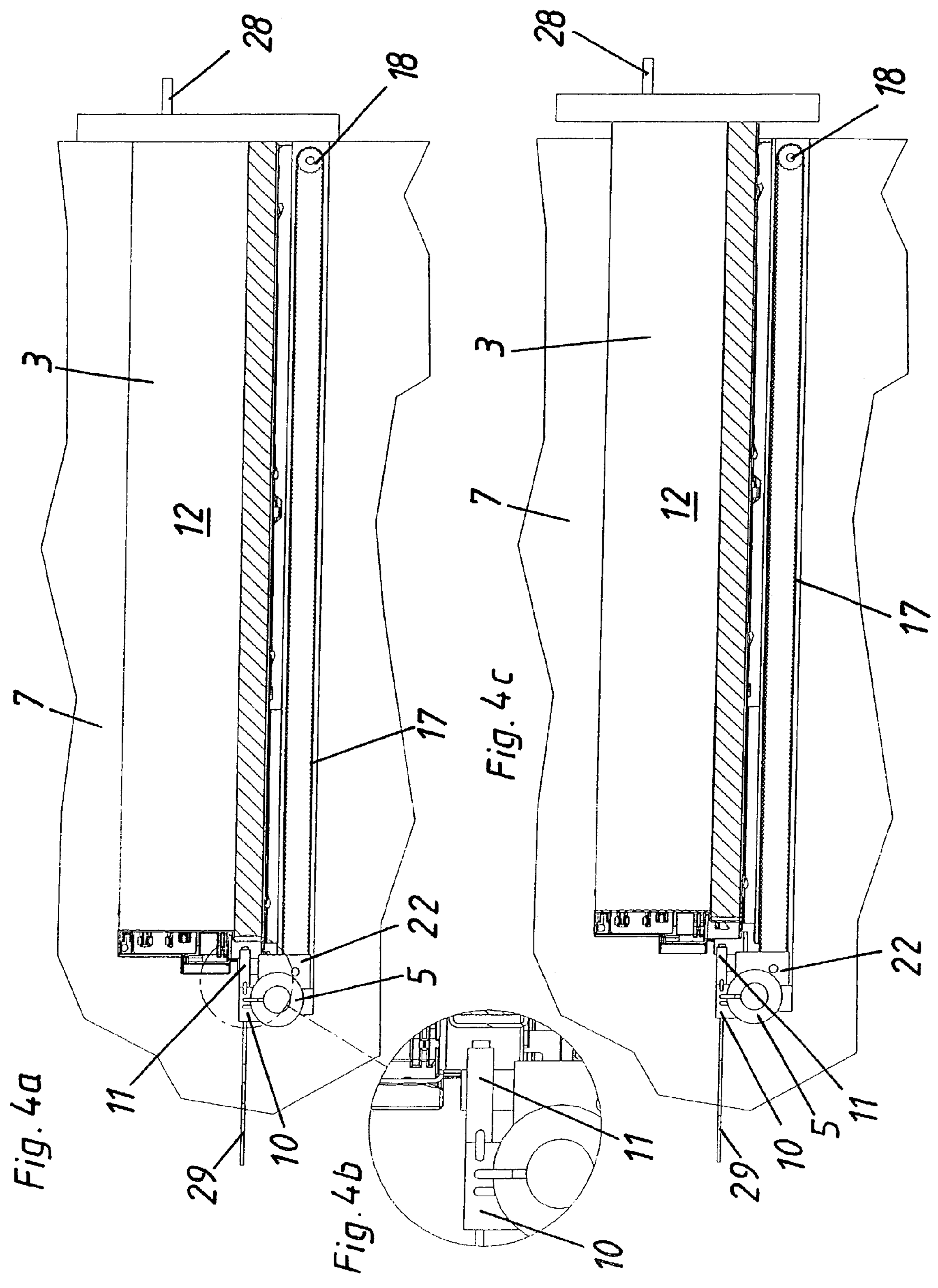
FIGS. 4a, 4b and 4c show an example embodiment of an arrangement according to the invention, partly in cross-section, with the movable furniture part in the closed end position, a detail view thereof, and with the movable furniture part in the triggered condition.

FIG. 4a shows a further example embodiment of an arrangement according to the invention, with the actuating element 11 of an initialization device 6 included in the drive unit. FIG. 4b shows in a detail that in the closed end position of the movable furniture part 3 there is a spacing between the rear side of the movable furniture part 3 and the actuating element 11, with the result that the actuating element 11 is actuated by the movable furniture part 3 without making contact. This is possible, for example, with an actuating element 11 constructed as an inductive sensor. FIG. 4c shows the movable furniture part 3 from FIGS. 4a and 4b in the triggered condition.

Figures 5A, 5B:
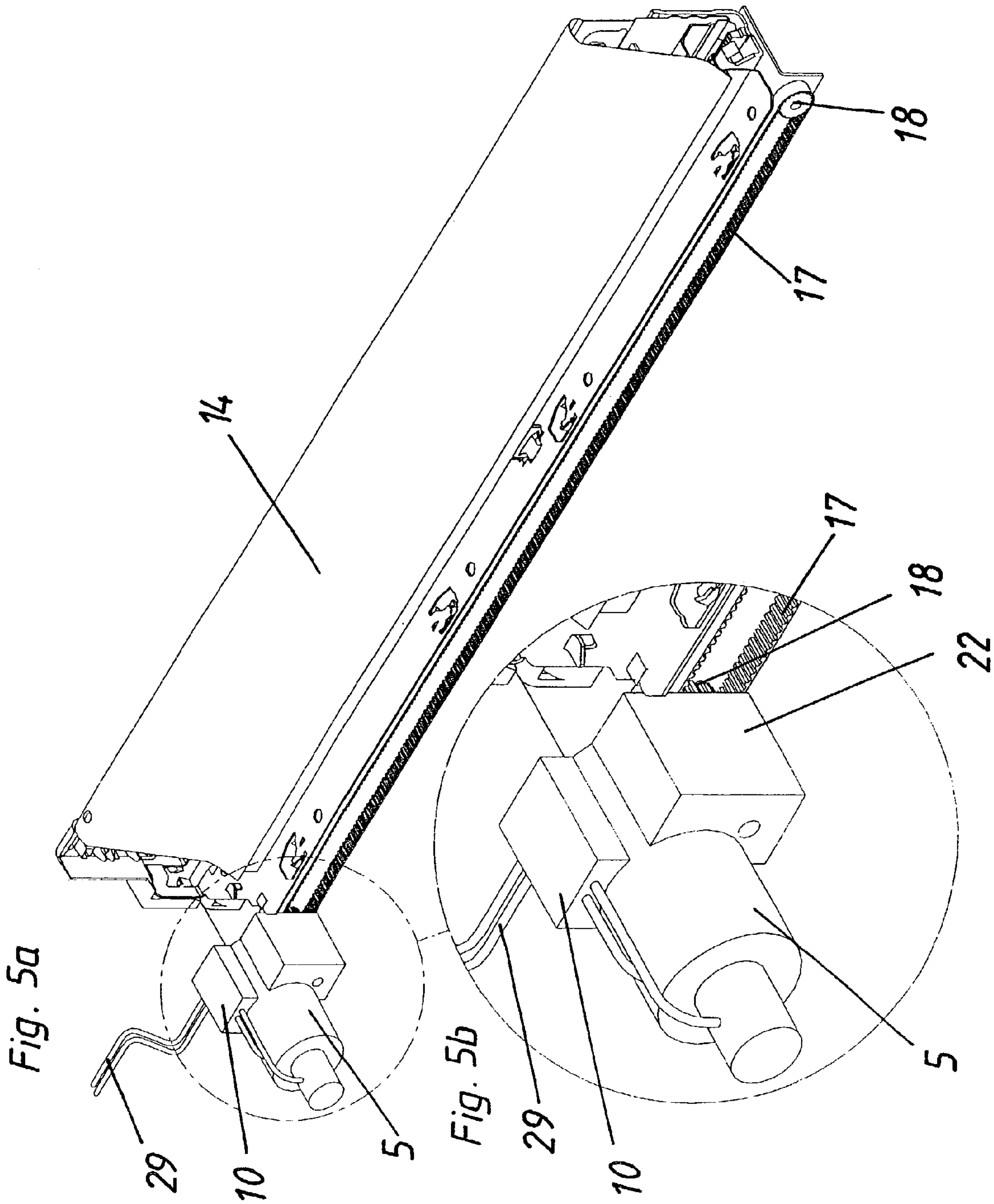
FIGS. 5a and 5b show a perspective view of components of an arrangement according to the invention and a detail view.

FIG. 5a shows, in a perspective view, one of the two frames 14 provided for lateral mounting on the inside of an arrangement according to the invention, with the two rollers 18 that are arranged on the frame and have corresponding teeth for the toothed belt 17 running over the rollers 18 visible. FIG. 5b shows, in a detail view, the drive unit 5 with the drive unit regulator 10, which in this example embodiment drives one of the rollers 18 and hence the toothed belt 17 by way of the gear 22 that is partly integrated in the drive unit 5. For reasons of clarity, the movable furniture part 3 has not been illustrated.

Figure 6:
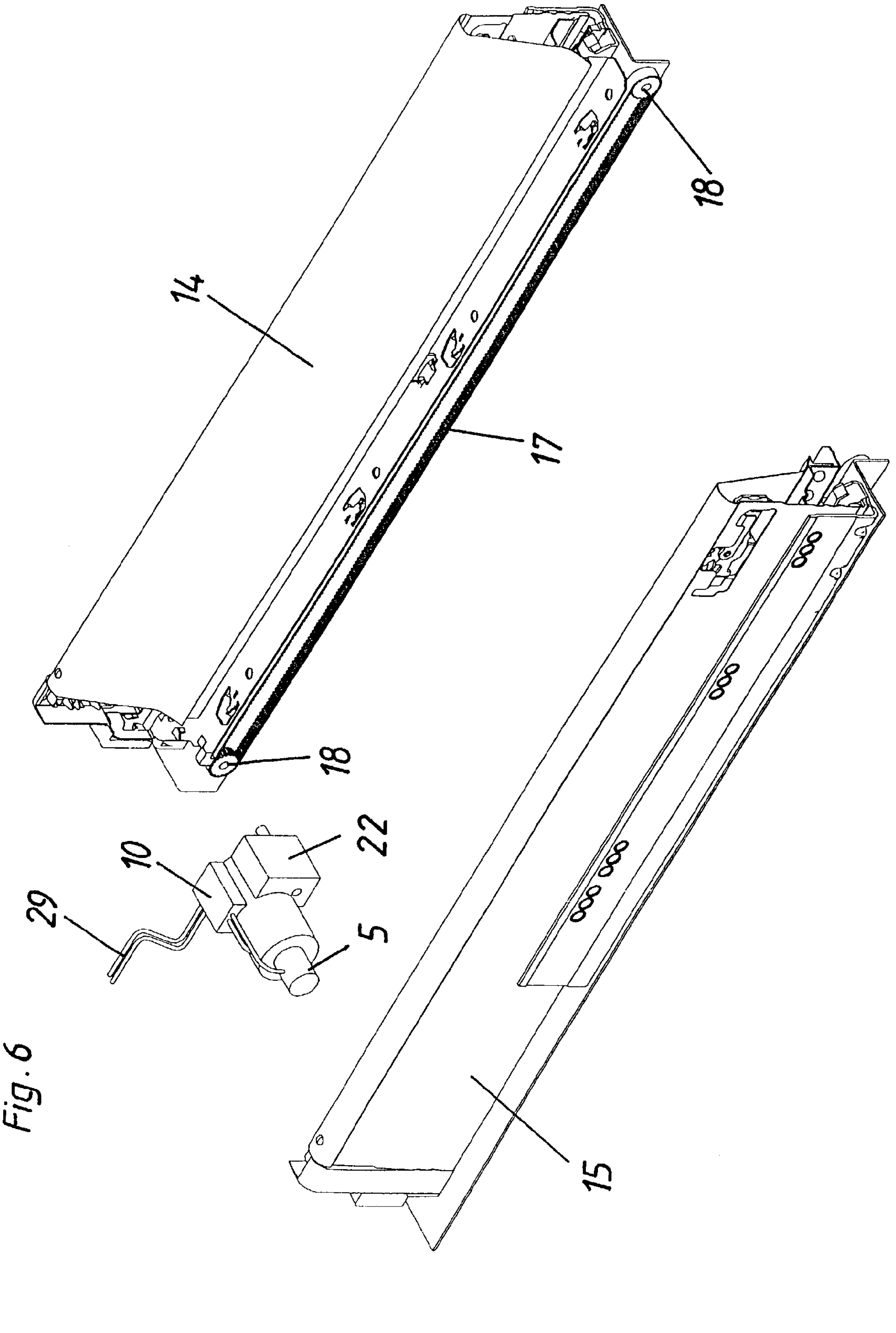
FIG. 6 shows a further perspective view of components of an example embodiment of an arrangement according to the invention.

FIG. 6 shows a further example embodiment in which both lateral frames 14, 15 are visible, with the drive unit 5 and the gear 22 included therein being secured, in the region between the frames, to the rear wall (not illustrated) of the arrangement according to the invention. For reasons of clarity, the movable furniture part 3 secured to the frames 14, 15 has not been illustrated.

Figures 7A, 7B, 8A, 8B:
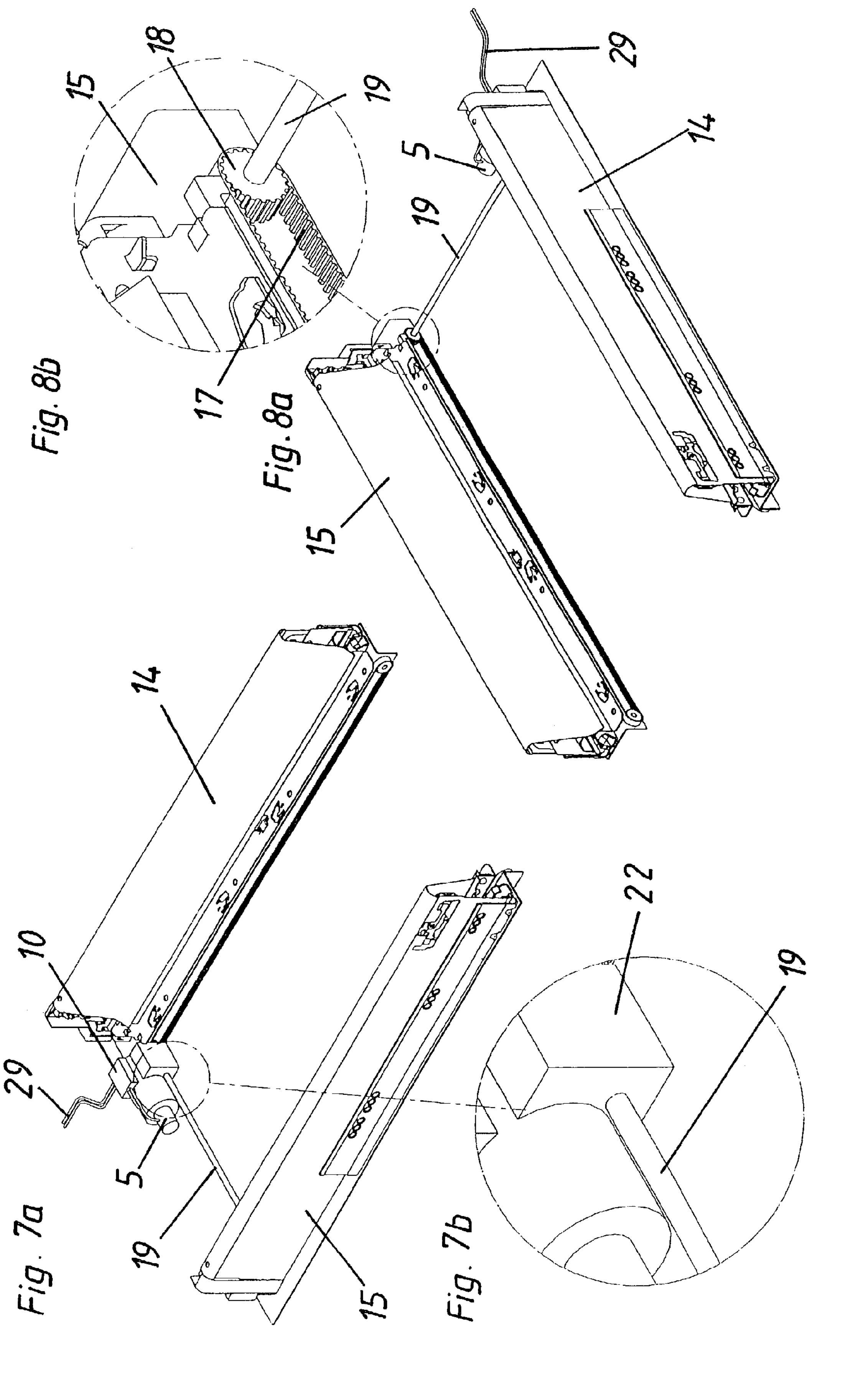
FIGS. 7a and 7b show a further perspective view of an example embodiment of an arrangement according to the invention, and a detail view.
FIGS. 8a and 8b show the same subject as FIGS. 7a and 7b from a different angle of view.

FIGS. 7a and 7b show an example embodiment in which the connection shaft 19 by way of which the drive unit 5 is connected to the rollers 18 of the two frames 15 is visible. In the detail of FIG. 7b it is clear in this example embodiment that the forces are exerted by way of an interposed gear 22.

FIG. 8a shows the arrangement from FIGS. 7a and 7b from another angle of view, with the result that the connection for the drive unit 5 to exert force by way of the connection shaft 19 on a roller 18 of the frame 15 further away from the drive unit 5 is visible.

Figure 9:
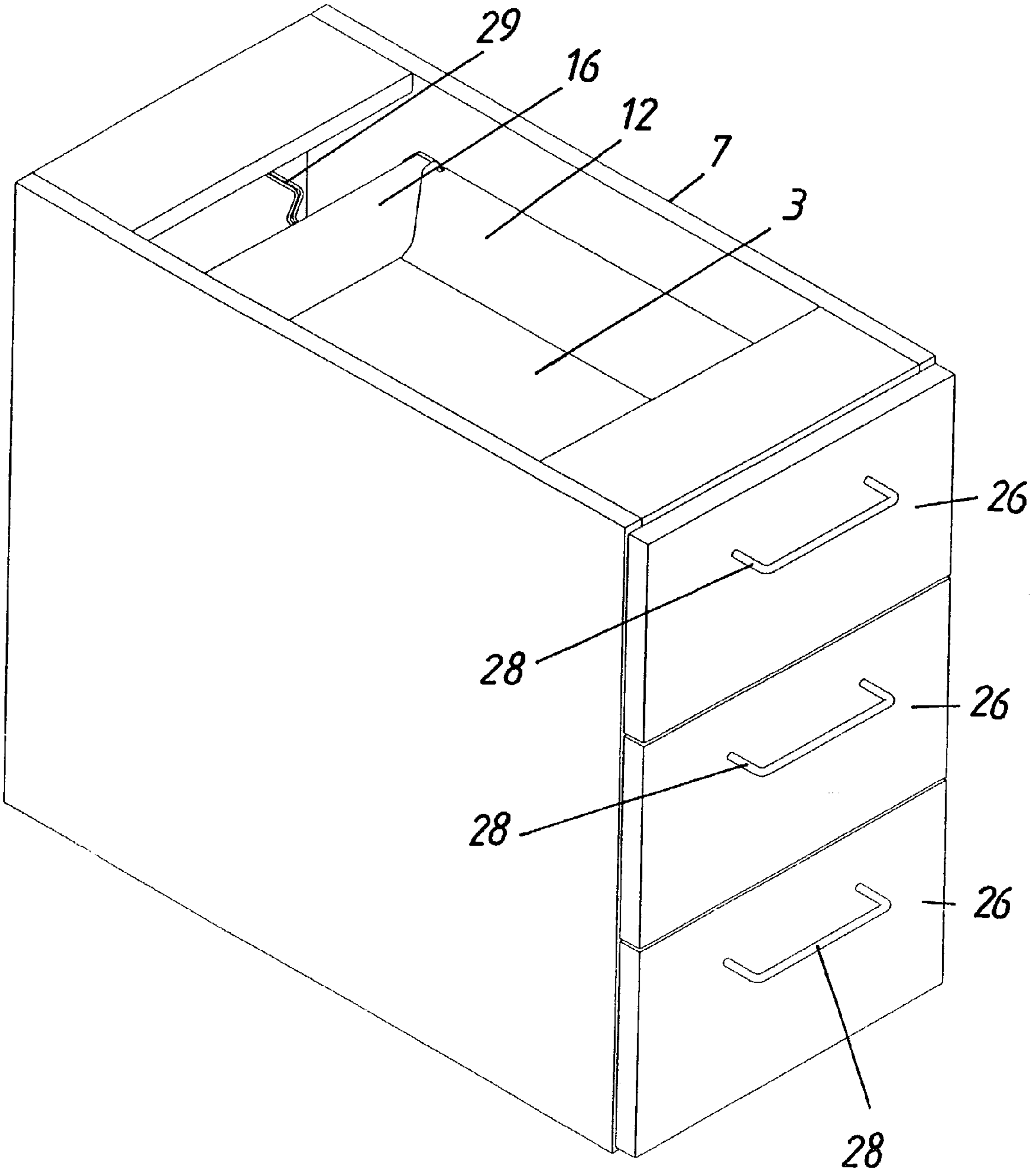
FIG. 9 shows a perspective view of an example embodiment of an arrangement according to the invention.

FIG. 9 shows a perspective view of an example embodiment of the arrangement 7 according to the invention, which has three movable furniture parts 3 with front panels 26 and handle elements 28. The movable furniture part 3 that is mounted uppermost is visible, in particular a side wall 12 and the rear wall 16 thereof. Part of the conductive connection 29 is visible through the cut-away portion.

Figure 10:
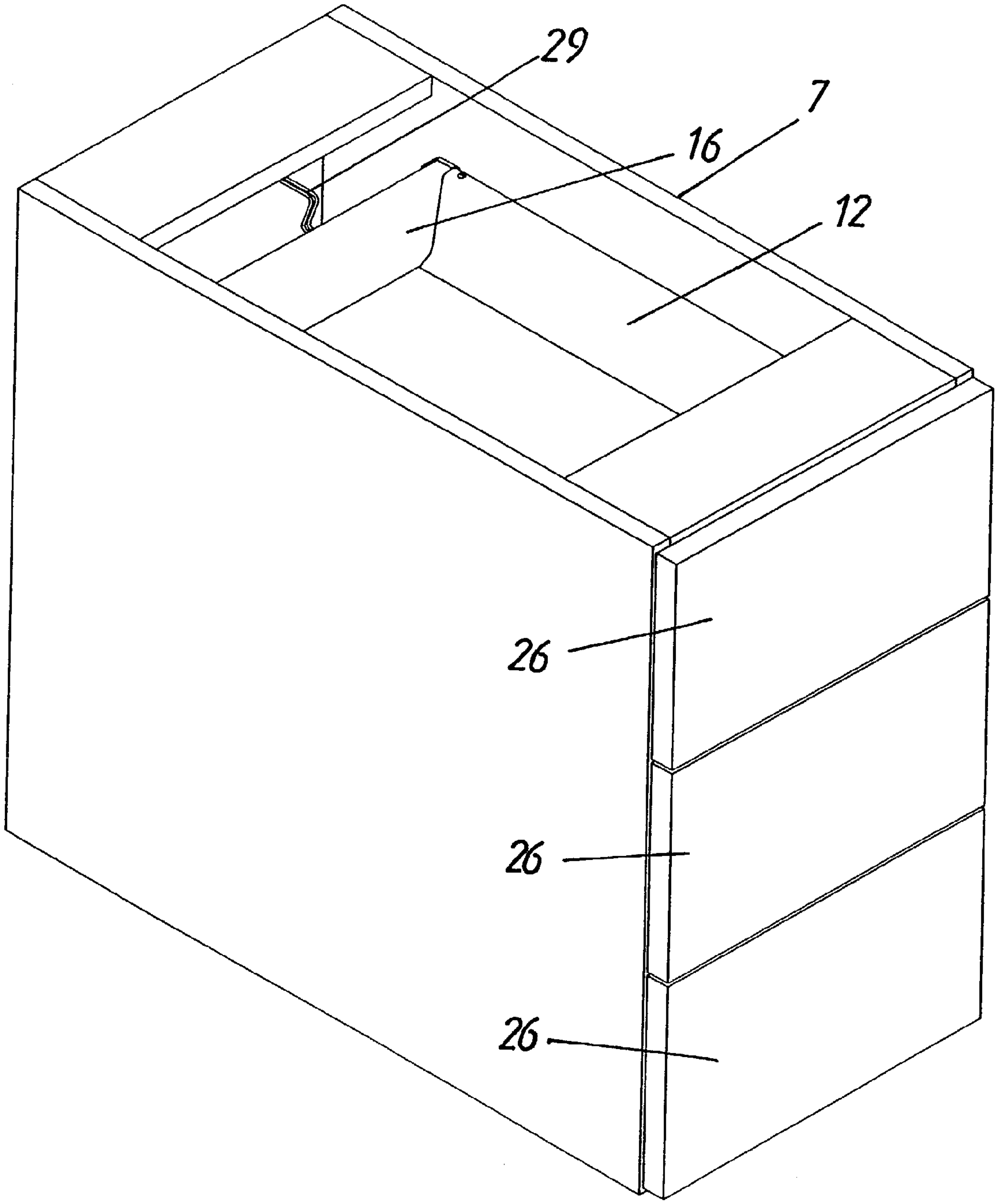
FIG. 10 shows a perspective view of a further example embodiment of an arrangement according to the invention.

FIG. 10 shows, similarly to FIG. 9, a variant on the arrangement according to the invention, in which a touch-latch construction is provided. Accordingly, no handle elements are provided on the front panels 26.

Figures 11A, 11B:
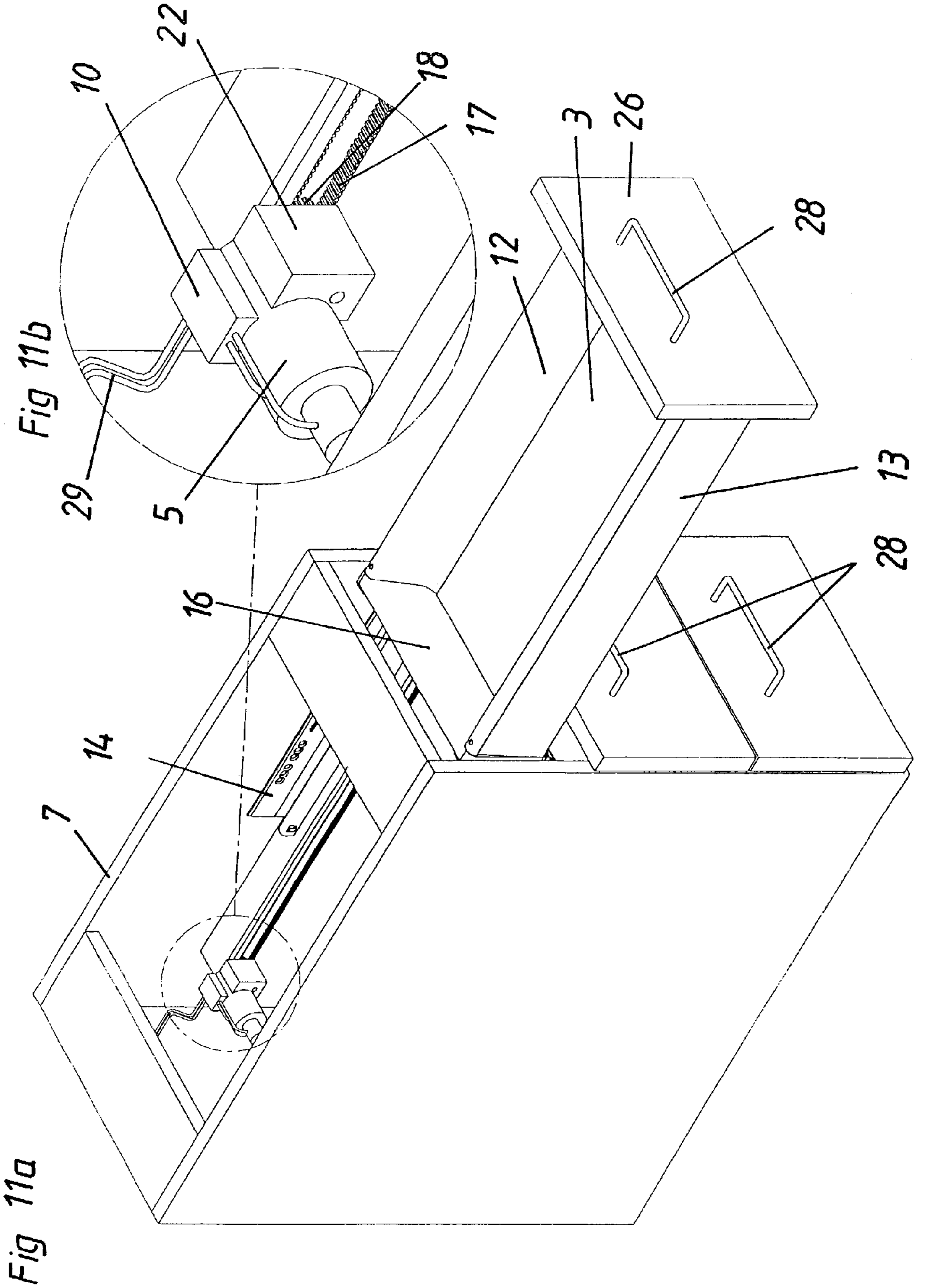
FIGS. 11a and 11b show perspective views of a further example embodiment of an arrangement according to the invention, with a movable furniture part in the opened end position, and a detail view.

FIG. 11*a* once again shows the arrangement according to the invention from FIG. 10, with the movable furniture part 3 that is mounted uppermost having been brought into the opened end position. On the inside of the arrangement 7 according to the invention, the frame 14 that is mounted on the side wall and comprises two parts, whereof the upper part is constructed to be movable, while the lower part is secured to a side wall of the arrangement 7 according to the invention, is visible. The detail view 11*b* shows the drive unit 5 with the drive unit regulator 10 and the gear 22, the roller 18, the toothed belt 17 and part of the power supply 29.

Figure 12C:
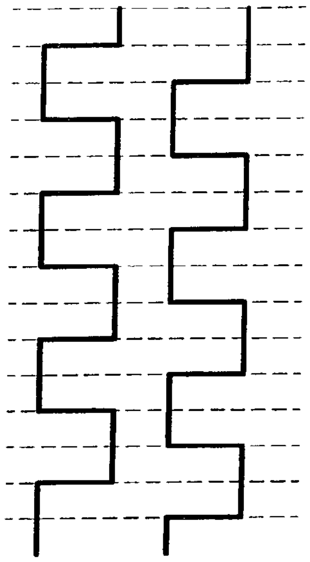
FIGS. 12a, 12b, 12c and 12d show diagrammatic illustrations of components of an arrangement according to the invention.
Figure 12B:
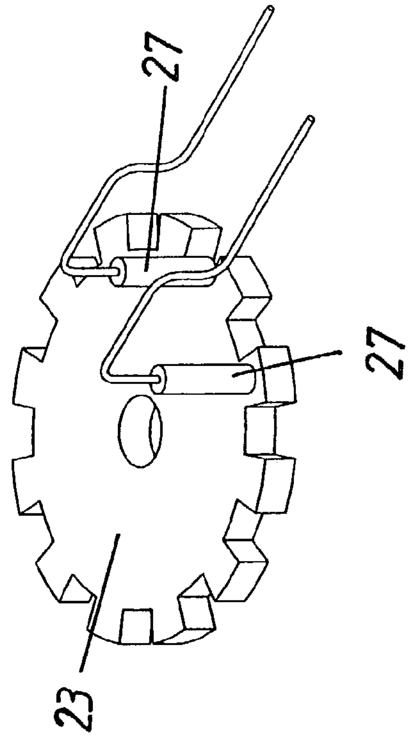
Figure 12A:
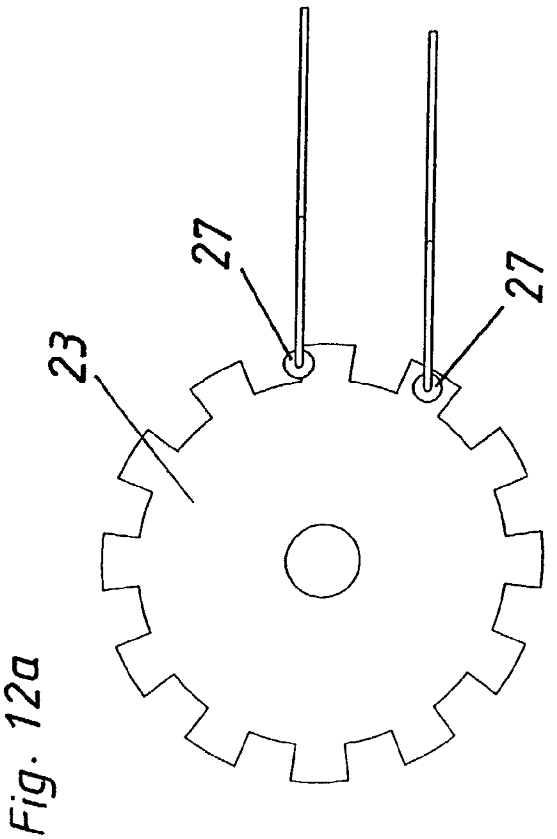
Figure 12D:
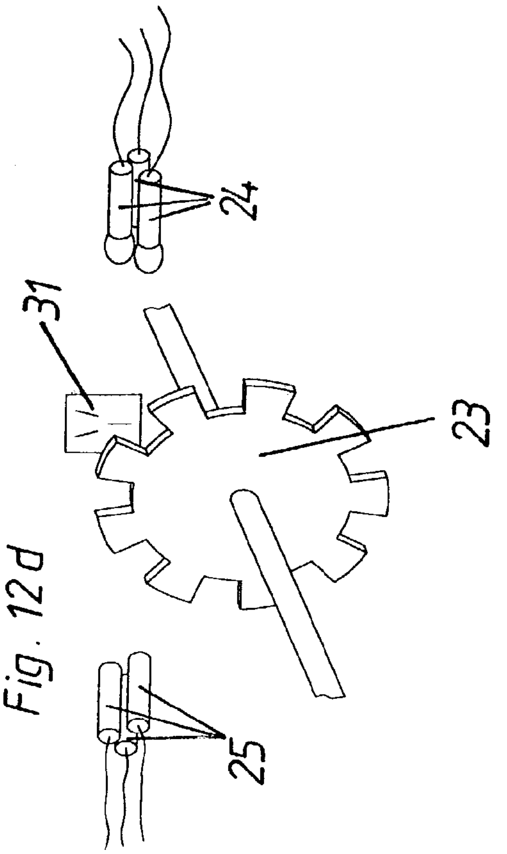

FIG. 12*a* shows a disk 23 of conductive material that corresponds to the prior art, is mounted to be rotatable and is part of a magnetic encoder (not illustrated in more detail), with the disk 23 connected to be rotatable with the drive unit 5 by way of a shaft (not illustrated). Further visible are inductive sensors 27 that are arranged directly over one of the two surfaces of the disk 23. As soon as the user exerts a force on the movable furniture part 3 (not illustrated here), the disk 23, connected to the drive unit 5, is set in rotary motion, with the result that the inductive sensors 27 pass on signals of the shape illustrated in FIG. 12*c* to the regulating unit 1, depending on whether they are located above conductive material of the disk 23 or above an air gap. As a result of the construction as a two-channel decoder, illustrated in these figures, it is possible to establish the speed of rotation from the width of the individual impulses between the two channels, and the direction of rotation of the disk 23 and hence of the drive unit 5 connected thereto from the phase angle of the individual impulses, and so to relate back therefrom to arrive at the linear movement of the movable furniture part 3. Thus, as soon as the user puts the movable furniture part 3 in motion in either direction, the regulating device 1 detects this through the electrical signals coming from the position measuring device 4, of which in this example embodiment the disk 23 and the sensors 27 form a part, and by way of an interposed drive unit regulator 10 gives the drive unit 5 the command for accelerating the movable furniture part 3 in the direction intended by the user. FIG. 12*b* shows a perspective view of the two components 23 and 27 from FIG. 12*a*. FIG. 12*d* shows elements of a position measuring device 4 of a further example embodiment that, in the present case, is constructed as an optical encoder and in this case of course at the same time forms an acceleration measuring device 2. Visible are light-emitting elements 25 whereof light falls by way of a screen 31 onto light-detecting elements 24 unless it is interrupted by the interposed rotating disk 23. The details of such measuring means can be found in the relevant literature of the art.

Figure 13A:
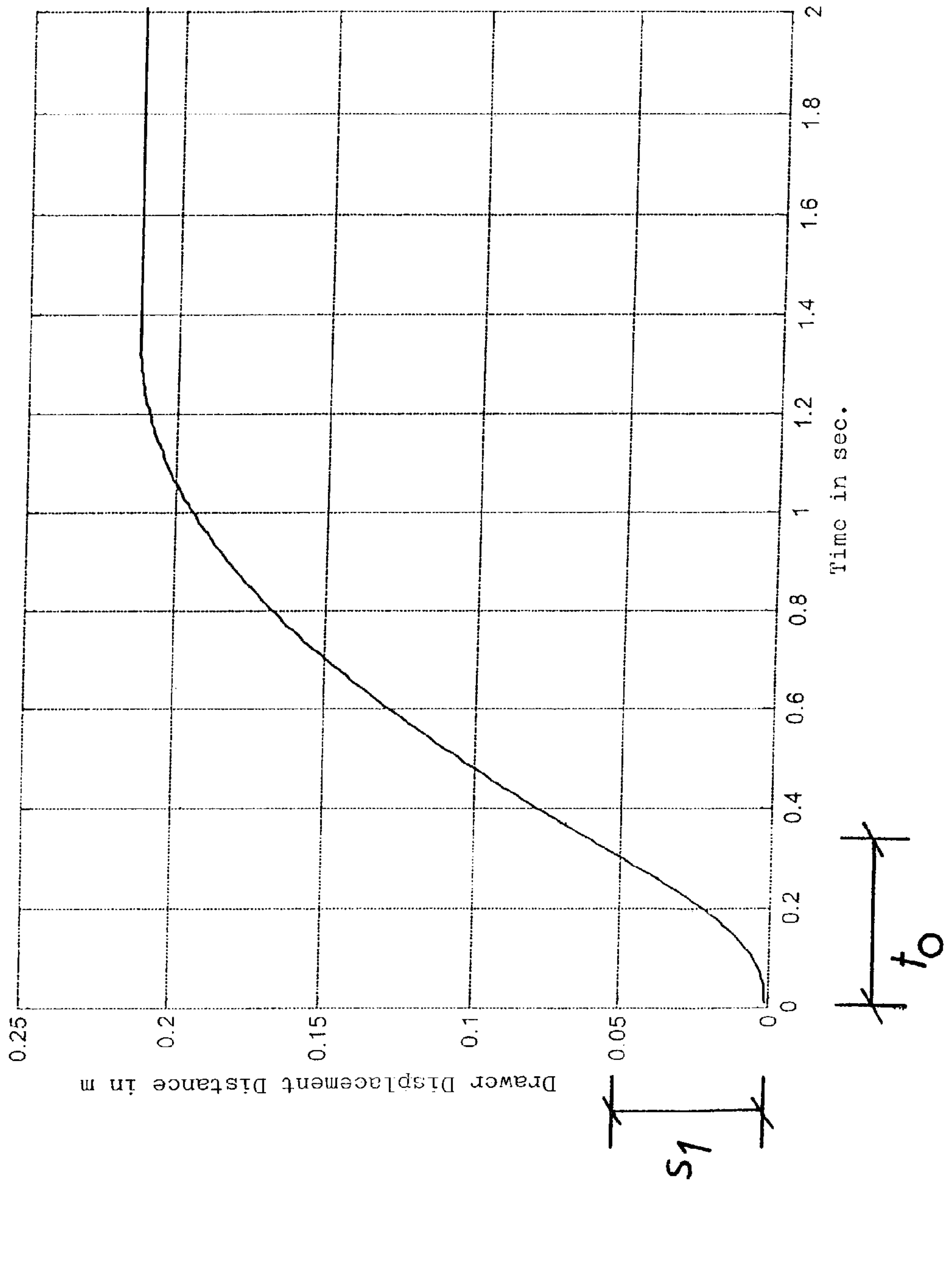
FIGS. 13a, 13b and 13c show distance/time graphs that describe by way of example the actuation of an arrangement according to the invention.
Figure 13B:
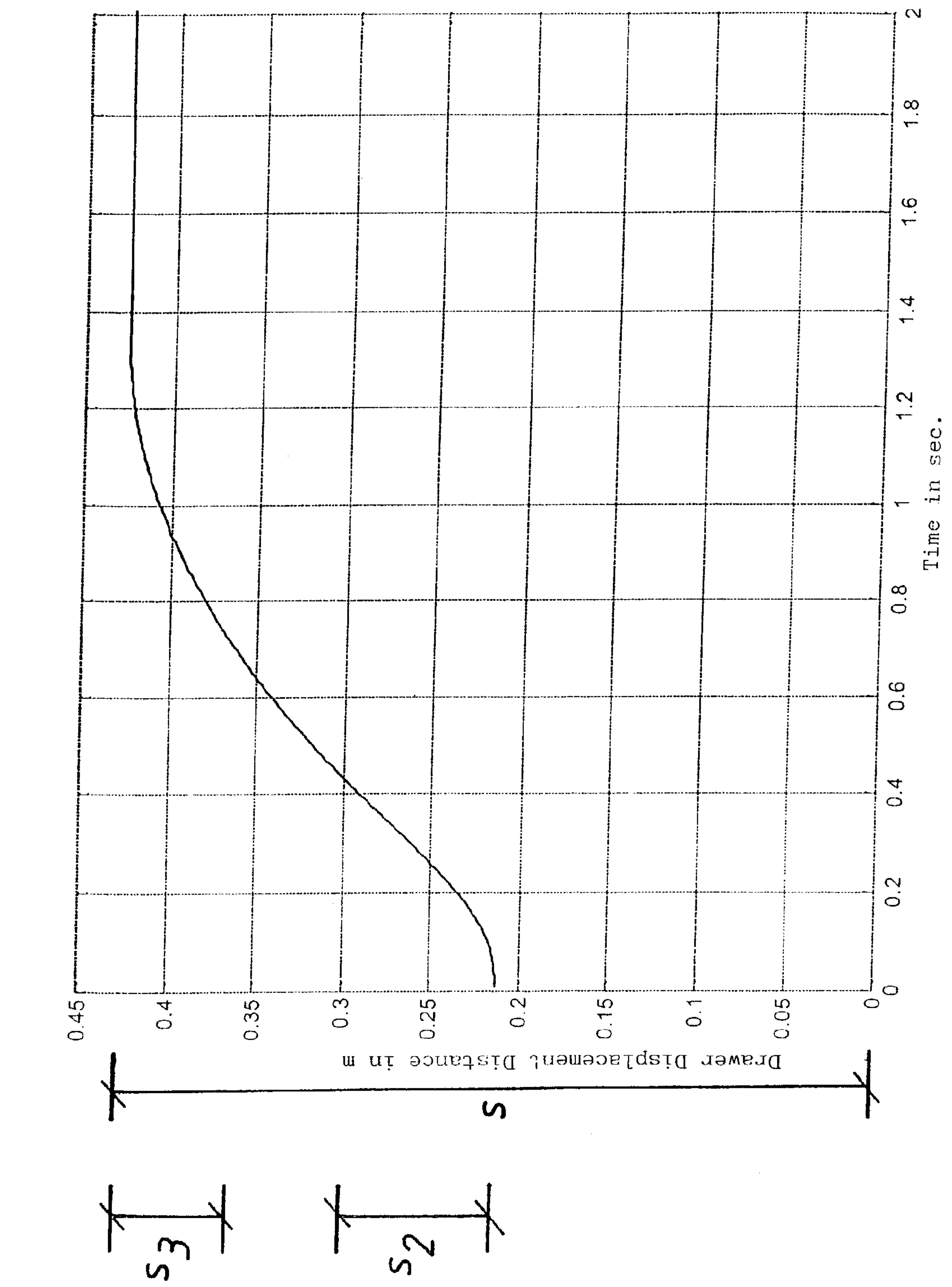
Figure 13C:
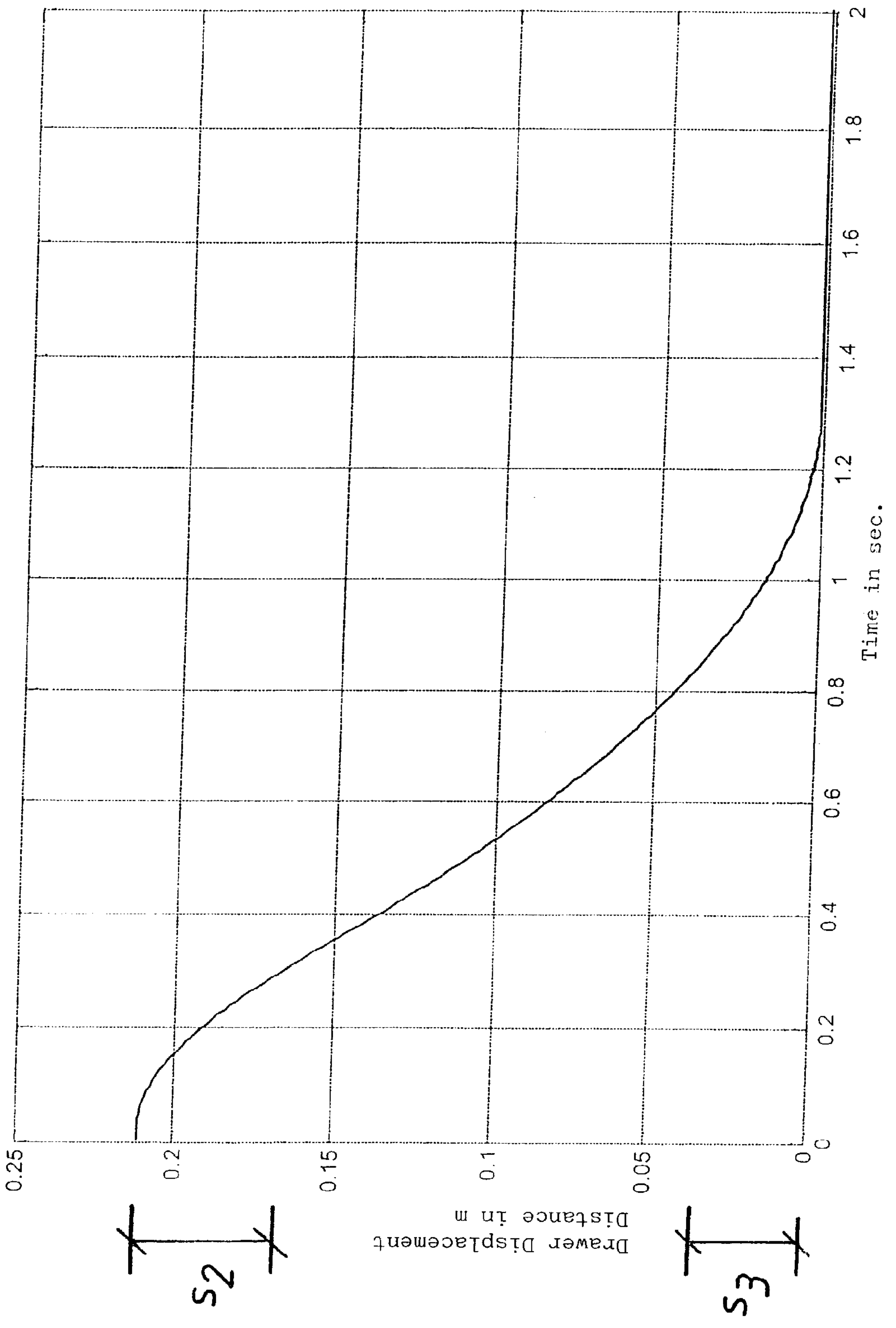

FIGS. 13*a*, 13*b* and 13*c* show, with the aid of distance/time graphs, a typical actuation procedure by way of example, in the course of which the movable furniture part 3 is moved from its closed end position into an intermediate position in which it comes to rest temporarily and, after another actuation by the user, is moved into the opened end position or alternatively into the closed end position again. In this example embodiment, by way of example, the assumption is made of a total distance S of approximately 0.43 m between the closed end position and the opened end position. The closed end position corresponds to the origin of the y axis, zero, in the distance/time graphs. In the construction as a touch-latch item of furniture, it goes without saying that the closed end position corresponds to a position of the movable furniture part 3 in which a gap 30 remains between its front panel 31 and the front side of the arrangement according to the invention. It is clear from FIG. 13*a* that within a first time span $t_0$ after actuation by the user an even acceleration of the movable furniture part 3 is performed by the drive unit 5 over a partial distance $S_1$ to support the opening movement. The subsequent movement of the movable furniture part 3 is performed only under the action of the friction inherent in the system, with the result that the movable furniture part 3 finally comes to rest in an intermediate position (here approximately at the 0.22 m point). FIG. 13*b* shows a possible profile in which the user exerts another pull on the movable furniture part 3 located in the intermediate position after a certain period, as a result of which the regulating unit 1 transmits to the drive unit 5, by way of the drive unit regulator 10, the command for accelerating the movable furniture part 3 evenly in the direction of the pulling acceleration performed. For this reason, visible in FIG. 13*b* are another evenly accelerated movement of the movable furniture part 3 by the drive unit 5 over a partial distance $S_2$, an interposed movement only under the action of the frictional force inherent in the system, which results in a certain braking of the movable furniture part 3, and another evenly accelerated movement over a partial distance $S_3$, with this time the acceleration by the drive unit 5 being opposed to the current speed of the movable furniture part 3 and so resulting in braking. In consequence thereof, the movable furniture part 3 comes to rest in the opened end position at negligible final speed, or at a speed of zero. In other words, the partial distance $S_3$ is a braking distance predetermined at the factory, which ensures safe braking of the movable furniture part 3 when it moves into the opened end position. For the user, this takes the form of an increased frictional effect in the region $S_3$. FIG. 13*c* shows a similarly possible shape for the profile, in which the user accelerates the movable furniture part 3 located in an intermediate position in the direction of the closed end position by the action of pushing. Once again visible is the immediately active supporting effect of the drive unit 5, which is mirrored in the evenly accelerated movement of the movable furniture part 3 over the partial distance $S_2$ in the distance/time graph. Also visible is a protective distance $S_3$ that occurs before the closed end position and in which the drive unit 5 brings about an evenly accelerated braking movement of the movable furniture part 3 in order to move the latter into the closed end position reliably and without generating unnecessary noise. It is clear that the partial distance lying between the partial distances $S_2$ and $S_3$ has been covered only under the action of the friction inherent in the system, in accordance with the basic idea of the invention. The partial distances $S_1$, $S_2$, $S_3$, illustrated in FIGS. 13*a*, 13*b*, 13*c*, of the total distance S between the closed end position and the open end position are conventionally pre-set at the factory. This is in accordance with the idea that the user does not want to be bothered with technical details. It goes without saying that it would be possible to provide for a user who is somewhat more comfortable technically to set the partial distances $S_1$, $S_2$, $S_3$ or the time span to over which an acceleration occurs within certain limits (that is to say, taking into account safety aspects) himself or herself.

Figure 14:
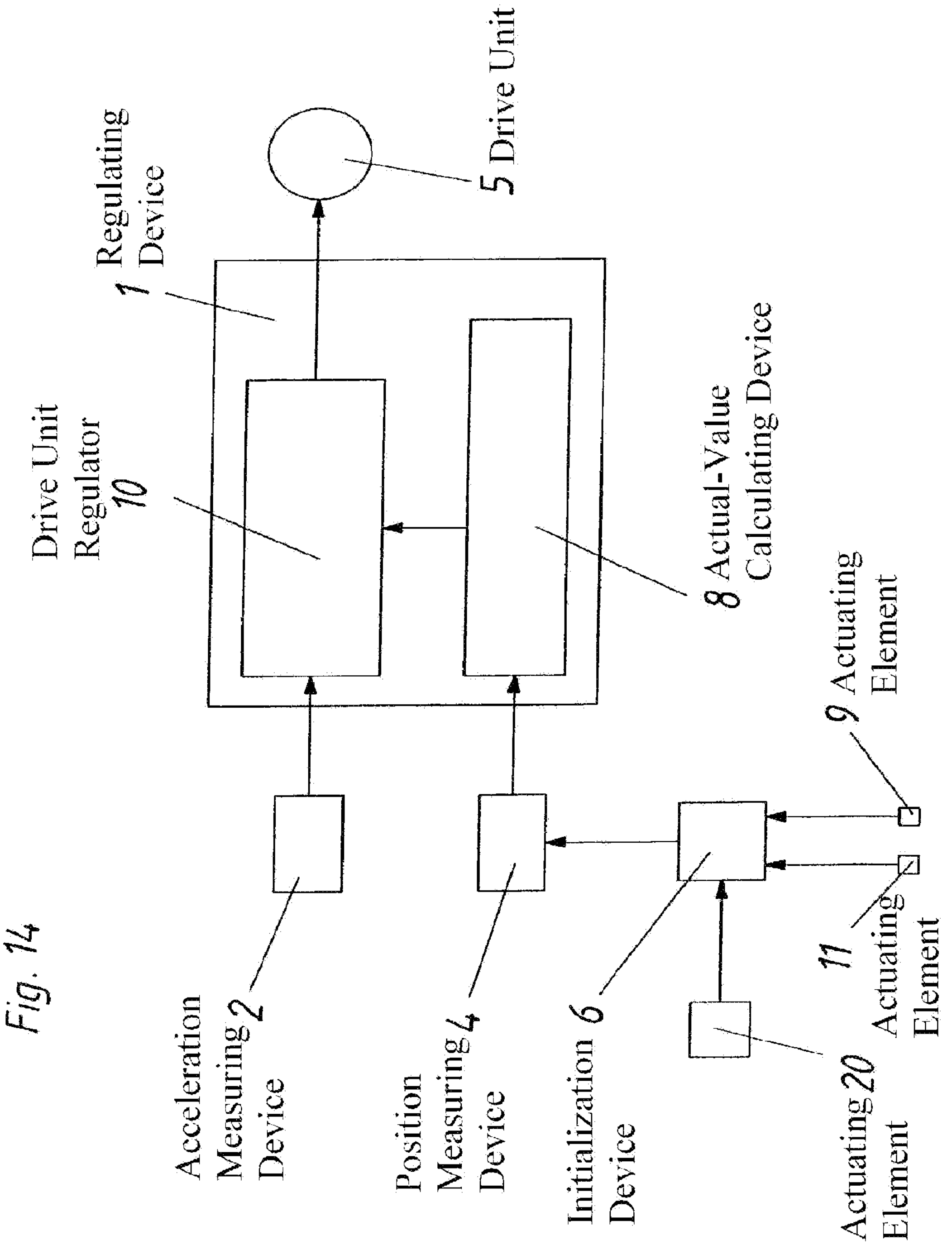
FIG. 14 shows a diagrammatic illustration of the flow of information between individual diagrammatically illustrated logical components of the arrangement according to the invention.

FIG. 14 illustrates diagrammatically the way in which the individual components of the arrangement according to the invention exchange information with one another. Visible diagrammatically is the regulating device 1, which includes a drive unit regulator 10 and an actual-value calculating device 8. The position measuring device 4 can pass on signals to the actual-value calculating device 8 and has the capacity itself to receive signals from the initialization device 6, which is in turn capable of being triggered by way of actuating elements 20, 11, 9. The drive unit regulator 10 receives signals from the acceleration measuring device 2 and the actual-value calculating device 8. The diagrammatic logical illustration of the flow of information between the system elements does not necessarily correspond to the physical arrangement thereof. For example, all the system elements may be arranged together in an integrated construction, physically in the arrangement 7 according to the invention, to save space. Frequently, it is also possible for a component that is present as a single part in physical form to take over a plurality of logical functions, as is the case for example with resolvers and optical or magnetic encoders. These may simultaneously serve as a position measuring device 4 and an acceleration measuring device 2. The angle of rotation of the disk of an optical or magnetic encoder on the one hand gives, for example, the possibility of an incremental determination of the position, and on the other hand just the fact that the disk is set in rotational motion and the detected change in speed give the possibility of measuring the acceleration. It goes without saying that an absolute position measurement may also be provided. Furthermore, there is the possibility of using a tachometer as a combined position and speed measuring device.

Figure 15A:
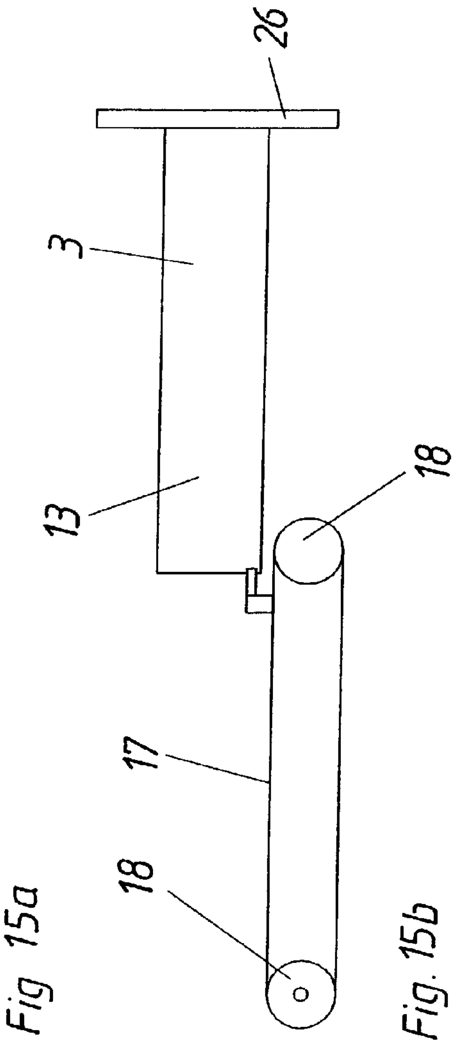
FIGS. 15a and 15b show a diagrammatic illustration of an arrangement according to the invention, from different angles of view.
Figure 15B:
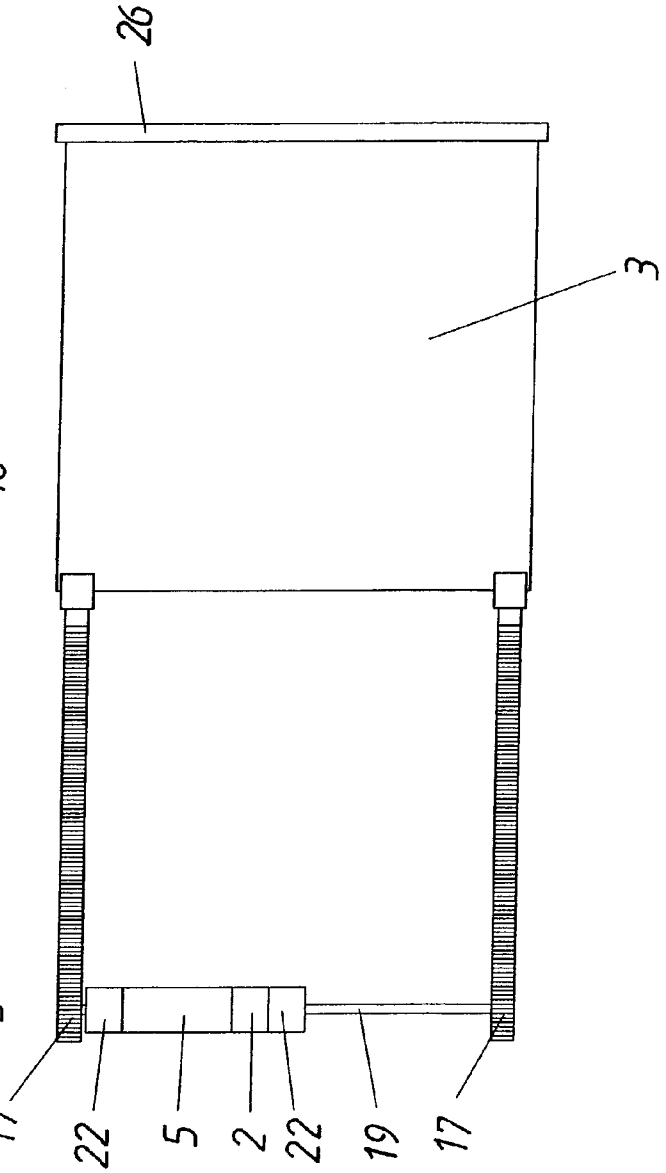

FIGS. 15*a* and 15*b* show diagrammatically, in side and plan view of the base surface of the movable furniture part 3, a conceivable arrangement of the system units. Visible in FIG. 15*a* is a side face 13 of the movable furniture part 3 with a front panel 26, in this example embodiment the arrangement 7 according to the invention being constructed as a touch-latch construction. The movable furniture part 3 is connected to a belt 17 that is for its part connected by way of two rollers 18 to a drive unit 5. In this example embodiment, forces are transmitted to both sides with the aid of a connection shaft 19. Forces are transmitted from the drive unit 5 in this example embodiment by way of two gears 22 that are arranged to left and right of the drive unit and are connected to the connection shaft 19. Also visible is an acceleration measuring device 2 that is arranged between a gear 22 and the drive unit 5. The other system components, such as the position measuring device 4, the actual-value calculating device 8, the drive unit regulator 10, the initialization device 6 and any actuating elements thereof, have not been illustrated in FIGS. 15*a* and 15*b*. They may be integrated in the system components illustrated as described above, in a manner known to the average person skilled in the art, and thus perform their functions.

In all the figures, the illustration and description of details corresponding to the prior art, and modes of functioning known to the average person skilled in the art, have been omitted.

What is claimed is:

1. An arrangement comprising:

at least one movable furniture part;

at least one drive unit;

at least one regulating device for regulating the at least one drive unit; and at least one acceleration measuring device for detecting an acceleration of the at least one movable furniture part caused by a pulling or pushing force applied to the at least one movable furniture part from outside the arrangement, the at least one acceleration measuring device being operable to generate an acceleration signal corresponding to the detected acceleration of the at least one movable furniture part caused by the pulling or pushing force, wherein the at least one acceleration measuring device is operable to supply the acceleration signal to the at least one regulating device, and wherein the at least one regulating device is operable to send the drive unit a control command for moving the movable furniture part in a direction of the pulling or pushing force.

2. An arrangement as claimed in claim 1, wherein the at least one drive unit includes an electric motor.

3. An arrangement as claimed in claim 1, wherein the acceleration signal contains information corresponding to the magnitude of the acceleration caused by the force applied to the movable furniture part from outside the arrangement.

4. An arrangement as claimed in claim 1, wherein the drive unit is operable to accelerate the movable furniture part approximately evenly over a predetermined time span.

5. An arrangement as claimed in claim 1, further comprising:

at least one position measuring device for generating a position signal corresponding to an opening condition of the movable furniture part, wherein the at least one position measuring device is operable to supply the position signal to the regulating device.

6. An arrangement as claimed in claim 5, wherein the drive unit is operable to accelerate the movable furniture part only over a predetermined partial distance, wherein the length of the predetermined partial distance is shorter than a length of a total distance between a closed end position and an opened end position of the movable furniture part.

7. An arrangement as claimed in claim 5, wherein the regulating device has an actual-value calculating device operable to calculate, from the position signal generated by the position measuring device, a current actual position of the movable furniture part.

8. An arrangement as claimed in claim 7, wherein, when a predetermined position signal is input, the regulating device is operable to adapt a current actual speed to a predetermined set speed by passing a regulating signal on to a drive unit regulator operable to control the drive unit.

9. An arrangement as claimed in claim 8, wherein the predetermined set speed is zero.

10. An arrangement as claimed in claim 9, wherein the predetermined set speed is achieved at the opened end position of the movable furniture part.

11. An arrangement as claimed in claim 10, wherein the predetermined set speed is achieved at the closed end position of the movable furniture part.

12. An arrangement as claimed in claim 9, wherein the predetermined set speed is achieved at the closed end position of the movable furniture part.

13. An arrangement as claimed in claim 5, wherein the regulating device has an actual-value calculating device for calculating, from the position signal generated by the position measuring device, a current actual speed of the movable furniture part.

14. An arrangement as claimed in claim 1, wherein the drive unit is operable to move the movable furniture part independent of the magnitude of the pulling or pushing acceleration.

15. An arrangement as claimed in claim 1, further comprising:

at least one initialization device for generating a signal corresponding to predetermined positions of the movable furniture part, wherein the at least one initialization device is operable to supply the signal at least to the position measuring device.

16. An arrangement as claimed in claim 15, wherein one of the predetermined positions is a closed end position of the movable furniture part.

17. An arrangement as claimed in claim 15, wherein one of the predetermined positions is an opened end position of the movable furniture part.

18. An arrangement as claimed in claim 16, wherein one of the predetermined positions is an opened end position of the movable furniture part.

19. An arrangement as claimed in claim 15, wherein the initialization device has a structure such that it is capable of being triggered by way of an actuating element that is actuable from outside the arrangement.

20. An arrangement as claimed in claim 15, wherein the initialization device has a structure such that it is capable of being triggered by way of an actuating element that is arranged within the arrangement and is actuable by the movable furniture part.

21. An arrangement as claimed in claim 20, wherein the actuating element is a pressure switch.

22. An arrangement as claimed in claim 20, wherein the actuating element is an inductive or capacitive sensor.

23. An arrangement as claimed in claim 15, wherein the initialization device has a structure such that it is capable of being triggered by a conductive connection established between the arrangement and a voltage source by a triggering element.

24. An arrangement as claimed in claim 15, wherein the initialization device has a structure such that it is triggered when a measured level of current supplied to the drive unit exceeds a predetermined maximum value within a predetermined time.

25. An arrangement as claimed in claim 24, wherein the drive unit regulator is operable to determine the measured level of current.

26. An arrangement as claimed in claim 15, wherein the initialization device has a structure such that it is triggered if a magnitude of a speed of the movable furniture part over a predetermined time span is less than or equal to a predetermined limit value, preferably zero.

27. An arrangement as claimed in claim 15, wherein the initialization device has a structure such that it may be triggered by being manually pulled out.

28. An arrangement as claimed in claim 1, wherein the movable furniture part is a drawer mounted movably on frames arranged laterally within the arrangement.

29. An arrangement as claimed in claim 28, wherein the drive unit is attached to one of the frames.

30. An arrangement as claimed in claim 28, wherein the drive unit is attached to an inner face of the arrangement opposite a rear wall of the movable furniture part.

31. An arrangement as claimed in claim 30, wherein the drive unit is positioned at approximately the same spacing from two side walls of the arrangement.

32. An arrangement as claimed in claim 1, wherein the drive unit is in constant connection with the movable furniture part.

33. An arrangement as claimed in claim 32, wherein the drive unit is in constant connection with the movable furniture part by at least one cable or at least one belt or by a toothed wheel engaging in a toothed rack.

34. An arrangement as claimed in claim 33, wherein the at least one belt or the at least one cable runs over at least two rollers that are arranged on a lateral frame.

35. An arrangement as claimed in claim 33, wherein at least two rollers are arranged on both of two lateral frames and the respective at least one belt or the at least one cable runs over them.

36. An arrangement as claimed in claim 35, wherein at least two rollers arranged on different frames are in a connection with one another by a connection shaft.

37. An arrangement as claimed in claim 36, wherein the connection shaft is rigid.

38. An arrangement as claimed in claim 33, wherein the at least one belt is a toothed belt.

39. An arrangement as claimed in claim 35, wherein the drive unit is operable to drive at least one roller on at least one frame.

40. An arrangement as claimed in claim 39, wherein the drive unit it operable to drive the at least one roller on at least one frame by a gear.

41. An arrangement as claimed in claim 1, further comprising:

a resolver or an optical encoder or a magnetic encoder for measuring one or more of the physical values of the movable furniture part of the group consisting of: position, speed, and acceleration, and for supplying one or more signals corresponding to one or more measured physical values at least to the regulating device.

42. An arrangement as claimed in claim 1, wherein the drive unit includes a brushless d.c. motor for measuring one or more of the physical values of the movable furniture part of the group consisting of: position, speed, and acceleration directly by way of a commutator signal of the motor, and for supplying one or more signals corresponding to one or more measured physical values to the regulating device.

43. An arrangement as claimed in claim 1, wherein the drive unit includes an electric motor and a position measuring device integrated into the electric motor.

44. An arrangement as claimed in claim 43, wherein the electric motor is a DC motor.

45. An arrangement as claimed in claim 1, wherein the movable furniture part is a drawer.

46. An arrangement as claimed in claim 1, wherein the acceleration measuring device is an analog acceleration measuring device.

47. An arrangement as claimed in claim 1, wherein the acceleration signal contains information corresponding to a direction of the acceleration caused by the force applied to the movable furniture part from outside the arrangement.

48. An arrangement as claimed in claim 47, wherein the force applied to the movable furniture part from outside the arrangement is a pulling force, and wherein the acceleration signal contains information corresponding to a directional component parallel to a direction of the pulling force.

49. A process for moving a movable furniture part that is mounted in or on an arrangement having a drive unit, a drive unit regulator and a position measuring device, the process comprising:

sending signals to the drive unit regulator from the position measuring device; and sending a command signal from the drive unit regulator to the drive unit for accelerating the movable furniture part based on the signals received by the drive unit regulator from the position measuring device, wherein the sending of the signals to the drive unit regulator comprises sending a signal corresponding to a change in a movement condition of the movable furniture part that is caused by a pulling or pushing force from outside the arrangement.

50. A process as claimed in claim 49, wherein the movable furniture part is a drawer.

51. A process as claimed in claim 49, wherein the drive unit comprises an electric motor.

52. A process for moving a movable furniture part that is mounted in or on an arrangement having a drive unit, a drive unit regulator and a position measuring device, the process comprising:

sending signals to the drive unit regulator from the position measuring device, wherein the sending of the signals includes sending a signal to the drive unit regulator from the position measuring device once the movable furniture part has moved over a predetermined distance; and sending a command signal from the drive unit regulator to the drive unit for accelerating the movable furniture part based on the signal sent to the drive unit regulator once the movable furniture part has moved over the predetermined distance.

53. A process as claimed in claim 52, wherein the distance to be covered by the movable furniture part, in accordance with which the position measuring device emits a signal to the drive unit regulator, is adjustable or adjusted differently depending on a direction of movement of the movable furniture part.

* * * * *